(12) United States Patent
Bodin et al.

(10) Patent No.: US 7,746,849 B2
(45) Date of Patent: Jun. 29, 2010

(54) PROVIDING PACKET-BASED MULTIMEDIA SERVICES VIA A CIRCUIT BEARER

(75) Inventors: Richard Bodin, St Nom la Breteche (FR); Michael Leeder, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 2096 days.

(21) Appl. No.: 10/630,999

(22) Filed: Jul. 30, 2003

(65) Prior Publication Data

US 2005/0025047 A1 Feb. 3, 2005

(51) Int. Cl.
*H04L 12/66* (2006.01)
(52) U.S. Cl. .................... 370/355; 370/236; 370/352
(58) Field of Classification Search ............... 370/229, 370/236, 352, 355
See application file for complete search history.

(56) References Cited

U.S. PATENT DOCUMENTS

| | | | |
|---|---|---|---|
| 6,424,657 B1 * | 7/2002 | Voit et al. ................... 370/412 |
| 6,608,832 B2 * | 8/2003 | Forslow ....................... 370/353 |
| 6,721,565 B1 * | 4/2004 | Ejzak et al. .................. 455/436 |
| 6,768,722 B1 * | 7/2004 | Katseff et al. ............... 370/260 |
| 6,775,542 B1 * | 8/2004 | Vilander et al. ............ 455/423 |
| 6,782,274 B1 * | 8/2004 | Park et al. ................. 455/552.1 |
| 2002/0110104 A1 * | 8/2002 | Surdila et al. ............... 370/338 |
| 2003/0133558 A1 * | 7/2003 | Kung et al. ............ 379/215.01 |
| 2005/0101245 A1 * | 5/2005 | Ahmavaara ..................... 455/1 |

FOREIGN PATENT DOCUMENTS

WO WO 02/28014 A2 4/2002

OTHER PUBLICATIONS

"Universal Mobile Telecommunications System (UMTS); Packet Switched Conversational Multimedia Applications; Default codecs (3GPP TS 26.236 version 5.0.0 Release 5); ETSI TS 126 236" ETSI Standards, European Telecommunications Standards Institute, Sophia-Antipo, FR, vol. 3-SA4, No. V500, Mar. 2002.

(Continued)

*Primary Examiner*—Jason E Mattis
(74) *Attorney, Agent, or Firm*—Haynes and Boone, LLP (57) ABSTRACT

Provided is a method and system for providing a packet-based multimedia service to a mobile device in a network. The service is defined by a telecommunications standard, such as the 3GPP IP multimedia subsystem (IMS) standard, and the network does not support packet quality of service (QoS) functionality as required by the standard. A communications session embodying the method may be initiated by the mobile device or by the network. The method begins by establishing simultaneous packet signaling and circuit bearer connections with the mobile device. Signaling information for the multimedia service may then be transferred via the packet signaling connection using a session initiation protocol (SIP) or similar protocol. Data for the multimedia service may be transferred via the circuit bearer connection. This enables a feature rich signaling protocol to be used to provide the multimedia service via the network in alignment with the standard, even though the network does not support the required QoS functionality.

18 Claims, 9 Drawing Sheets

OTHER PUBLICATIONS

"Digital Cellular Telecommunications System (Phase 2+); Universal Mobile Telecommunications System (UMTS); IP multimedia (IM) session handling; IM call model; Stage 2 (3GPP TS 23.218 version 5.4.0 Release 5); ETSI TS 123 218" ETSI Standards, European Telecommunications Standards Institute, Sophia-Antipo, FR, vol. 3-CN1, No. V540, Mar. 2003.

"Digital Cellular Telecommunications System (Phase 2+); Universal Mobile Telecommunications System (UMTS); IP Multimedia Subsystem (IMS); Stage 2 (3GPP TS 23.228 version 5.9.0 Release 5); ETSI TS 123 228" ETSI Standards, European Telecommunications Standards Institute, Sophia-Antipo, FR, vol. 3-SA2, No. V590, Jun. 2003.

"Digital Cellular Telecommunications System (Phase 2+); Universal Mobile Telecommunications System (UMTS); Network architecture (3GPP TS 23.002 version 5.11.0 Release 5); ETSI TS 123 002" ETSI Standards, European Telecommunications Standards Institute, Sophia-Antipo, FR, vol. 3-SA2, No. V5110, Jun. 2003.

\* cited by examiner

PROVIDING PACKET-BASED MULTIMEDIA SERVICES VIA A CIRCUIT BEARER

BACKGROUND

The present disclosure relates generally to wireless communications systems and, more particularly, to supporting Internet protocol (IP) based multimedia services using a circuit bearer.

Telecommunications systems, such as universal mobile telecommunications system (UMTS) wireless networks, are evolving into systems that may carry both voice and data traffic via fixed, wireless, and satellite networks. Part of this evolution includes developing and providing packet frameworks for the delivery of IP based, real-time, conversational, multimedia services. For example, an IP multimedia subsystem (IMS) standard has been defined as part of a third generation partnership project (3GPP) to provide such services.

Standards (such as IMS) that address the delivery of multimedia services via a packet based network generally require quality of service (QoS) mechanisms that are intended to ensure a certain level of quality. However, most wireless packet networks require relatively substantial enhancements before such QoS mechanisms can be provided, which slows down the implementation of the associated standards. For example, while IMS provides a framework to support the delivery of multimedia services in a wireless network, most wireless networks need upgrades to their access/radio layers, as well as to their packet core/general packet radio service (GPRS) subsystems before IMS can be properly supported. Implementing these upgrades may involve a considerable amount of time and expense, as the upgrades will need to be developed, deployed, and tested.

Accordingly, what is needed is an improved system and method to provide for the delivery of IP based, real-time, conversational, multimedia services. It is desirable to deliver these services to mobile devices via networks that may not support QoS mechanisms specified for the delivery of such services. It is also desirable to deliver the services in compliance with defined telecommunications standards, and for the system and method to align with standards that are currently being implemented or that may be implemented in the future.

SUMMARY

In one embodiment, a method is provided for providing a packet-based multimedia service to a mobile device in a network. The service is defined by a telecommunications standard, and the network does not support packet quality of service (QoS) functionality as required by the standard. The method comprises establishing a packet signaling connection and a circuit bearer connection between the mobile device and network. Signaling information for the multimedia service is transferred via the packet signaling connection in alignment with the standard. Data for the multimedia service is transferred via the circuit bearer connection in alignment with the standard. This provides the multimedia service to the mobile device via the network as specified by the standard, even though the network does not support the required QoS functionality.

DETAILED DESCRIPTION

The present disclosure relates generally to wireless communications systems and, more particularly, to supporting Internet protocol (IP) based multimedia services using a circuit bearer. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
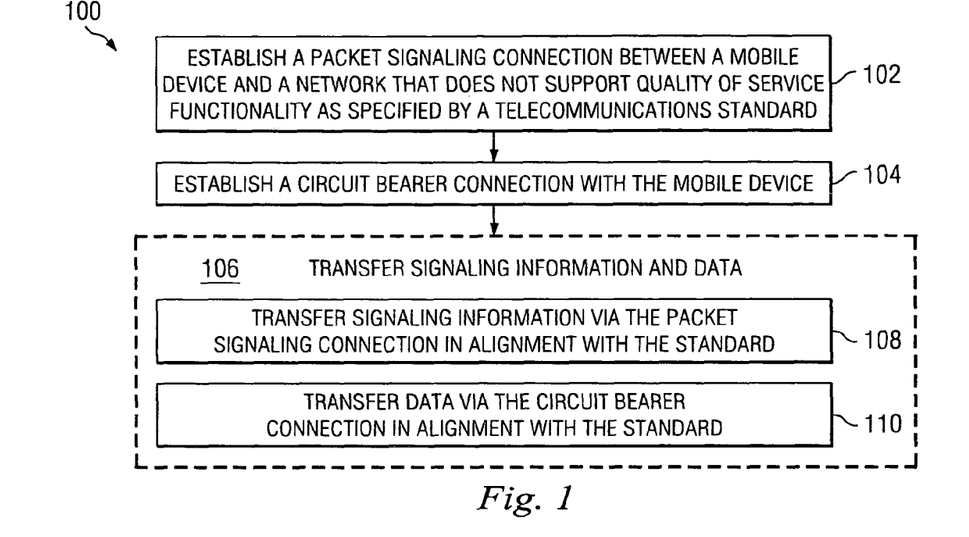
FIG. 1 is a flowchart of an exemplary method for providing multimedia services to a mobile device using a circuit bearer.

Referring to FIG. 1, in one embodiment, a method 100 may be used to provide a packet-based multimedia service to a mobile device in a network. As will be described later in greater detail, the service is defined by a telecommunications standard that specifies quality of service (QoS) functionality for packet-based data transfers. However, the network does not support such QoS functionality. Accordingly, the method 100 may be used for providing the multimedia service in accordance with the standard on the non-compliant network.

In step 102, a packet signaling connection may be established between the mobile device and network. This signaling connection may use, for example, a signaling protocol that provides call setup, routing, authentication, and other messages to endpoints within an IP network. In step 104, a circuit bearer connection is established between the mobile device and network. Because the circuit bearer and packet signaling connections exist simultaneously, the mobile device should have functionality that supports this dual connection operation.

In step 106, signaling information and data associated with the multimedia service may be transferred between the network and the mobile device. For example, in step 108, signaling information for the multimedia service may be transferred via the packet signaling connection in alignment with the standard. In step 110, data for the multimedia service may be transferred via the circuit bearer connection in alignment with the standard. It is understood that steps 108 and 110 may occur simultaneously, as signaling and data transfer may occur throughout a communication session. Accordingly, the method 100 enables the multimedia service to be provided to the mobile device via the network as specified by the standard, even though the network does not support the specified QoS functionality.

Figure 2:
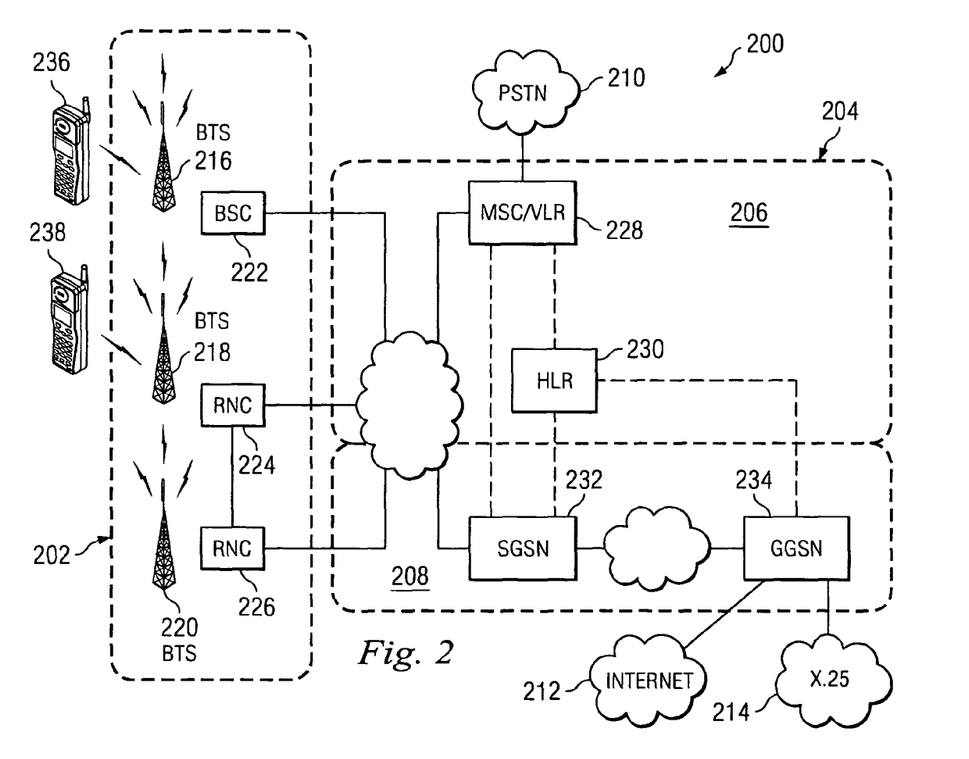
FIG. 2 illustrates an exemplary UMTS wireless network in which the method of FIG. 1 may be implemented.

Referring now to FIG. 2, a telecommunications network 200 illustrates a system in which the method 100 described in reference to FIG. 1 may be practiced. In the present example, the network 200 is a wireless network that supports both voice and data packet communications using General Packet Service Radio (GPRS) and/or Universal Mobile Telecommunications System (UMTS) technologies.

The network 200 comprises a Radio Access Network (RAN) 202 and a core network 204. The core network 204 further comprises a circuit domain 206 and a packet domain 208. Other networks may be accessible to the network 200, such as a Public Switch Telephone Network (PSTN) 210 (connected to the circuit domain 206), Internet 212, and an X.25 network 214 (both connected to the packet domain 208). The RAN 202 includes a plurality of cells (not shown) serviced by base transceiver stations (BTS) 216, 218, and 220. The BTS 216 is connected to a base station controller (BSC) 222 to provide a second-generation wireless network. The BTSs 218, 220 are accessible to radio network controllers (RNCs) 224, 226, respectively, to provide a third-generation wireless network. A mobile switching center/visitor location register (MSC/VLR) 228 may be used to connect the core network 204 with other networks, such as the PSTN 210. A home location register (HLR) 230 may be accessible to the MSC/VLR 228 and also to a serving GPRS support node (SGSN) 232 and a gateway GPRS support node (GGSN) 234 in the packet domain 208.

The network 200 enables at least one mobile device 236 to establish a communication session with another device via the BTS 216. For example, a request to establish a communication session with the mobile device 236 may be directed by the MSC/VLR 228 to (1) a second mobile device 238, (2) a voice terminal (not shown) coupled to the PSTN 210, or (3) a data terminal (not shown) coupled elsewhere to the telecommunications network 200. For example, if the communication session is a circuit data transfer session, the request may be to connect the mobile device 236 to a computer or other data device via the network 200. If the communication is a packet data transfer session, the request may be routed through the SGSN 232, the GGSN 234, and to the Internet 212. It is noted that the mobile devices 236 and 238, while illustrated as mobile telephones, may be any mobile device capable of communicating via the network 200. Furthermore, the mobile devices 236, 238 may be capable of simultaneous circuit/data (e.g., packet) connections. It is understood that the network 200 is for purposes of illustration and the present disclosure may be equally applicable to other networks.

Figure 3:
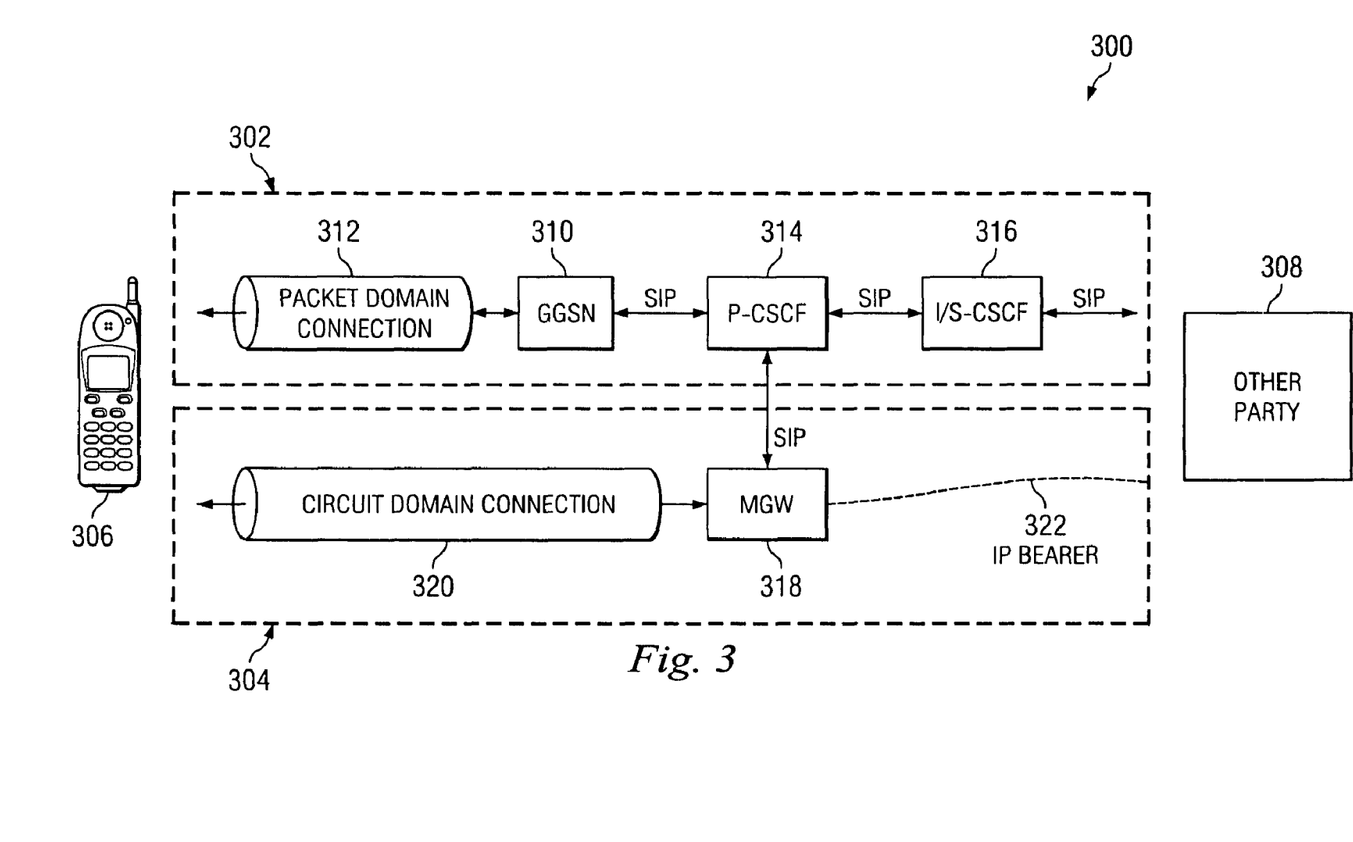
FIG. 3 illustrates one embodiment of an architecture that may be used to implement the method of FIG. 1 within the system of FIG. 2.

Referring now to FIG. 3, an architecture 300 may be used to implement a call session representing the method 100 of FIG. 1. In the present example, the call session may be requested by the network via a media gateway or by an end user, such as a mobile station. The session is to provide IP based, real-time, conversational, multimedia services. For example, the services may be provided using an IP multimedia subsystem (IMS), which is defined as part of a third generation partnership project (3GPP). However, providing these services in compliance with 3GPP may require certain QoS mechanisms that may not exist in some networks, such as QoS for packet and access layers associated with the telecommunications network 200 of FIG. 2. Accordingly, the architecture 300 enables the use of 3GPP IMS services prior to the introduction of the IP QoS mechanisms as follows, although it is understood that the present disclosure may also be implemented in a network in which such QoS mechanisms do exist.

The architecture 300 comprises a signaling path 302 and a bearer path 304 between a mobile station (MS) 306 (e.g., a dual mode mobile phone capable of simultaneous circuit/data connections) and another party 308. The MS 306 is connected to a GGSN 310 via a packet domain connection 312 (e.g., using dynamic host configuration protocol (DHCP), domain name service (DNS), etc.). The GGSN 310 is connected to a Proxy Call Session Control Function (P-CSCF) 314, which in turn may communicate with a Serving Call Session Control Function (S-CSCF) 316. It is understood that other network entities may be used, such as an Interrogatory Call Session Control Function (I-CSCF) (shown with the S-CSCF 316). The P-CSCF 314 may provide a point of contact in a visited network after the MS 306 is registered in the network. The S-CSCF 316 may be used to identify privileges associated with the MS 306, as well as for selecting and providing access to a home network application server (not shown). The I-CSCF (also 316) may be used to locate the S-CSCF and hide the S-CSCF's network architecture. The P-CSCF 314 and I/S-CSCF 316 may be viewed as functional blocks that may be located on any of a plurality of network nodes, including within the GGSN 310. The I/S-CSCF 316 communicates with the other party 308 via SIP messaging.

The MS 306 is connected to a media gateway (MGW) 318 via a circuit domain connection 320. The MGW 318 is in communication with the other party 308 via an IP bearer path 322. In the present example, the MGW 318 mediates the circuit switched bearer traffic received from the MS 306 via the circuit domain connection 320 into IP packet based bearer traffic. The bearer path 304 may be initiated by the MS 306 or by an intelligent node in the network, such as the MGW 318. As will be shown later in greater detail, the messaging used to establish the call session within the architecture 300 enables the session to accommodate later network changes, such as the implementation of QoS mechanisms. It is noted that the circuit domain connection 320 is used solely for bearer traffic to and from the MS 306, while signaling information is routed via the P-CSCF 314.

In operation, as will be described in greater detail in FIG. 4, a first leg of the session is established via the circuit domain connection 320. This may be accomplished by establishing a signaling PDP context between the MS 306 and the P-CSCF 314 (via the GGSN 310). SIP signaling then occurs between the MS 306 and the P-CSCF 314 to establish a call session. Network services may be executed using the S-CSCF 316, and a circuit bearer is requested to establish the circuit domain connection 320. A second leg of the connection is established to the other party 308 via the MGW 318 using either a packet or circuit connection. The MGW 318 then bridges both the first and second legs to connect the MS 306 and other party 308.

Figure 4:
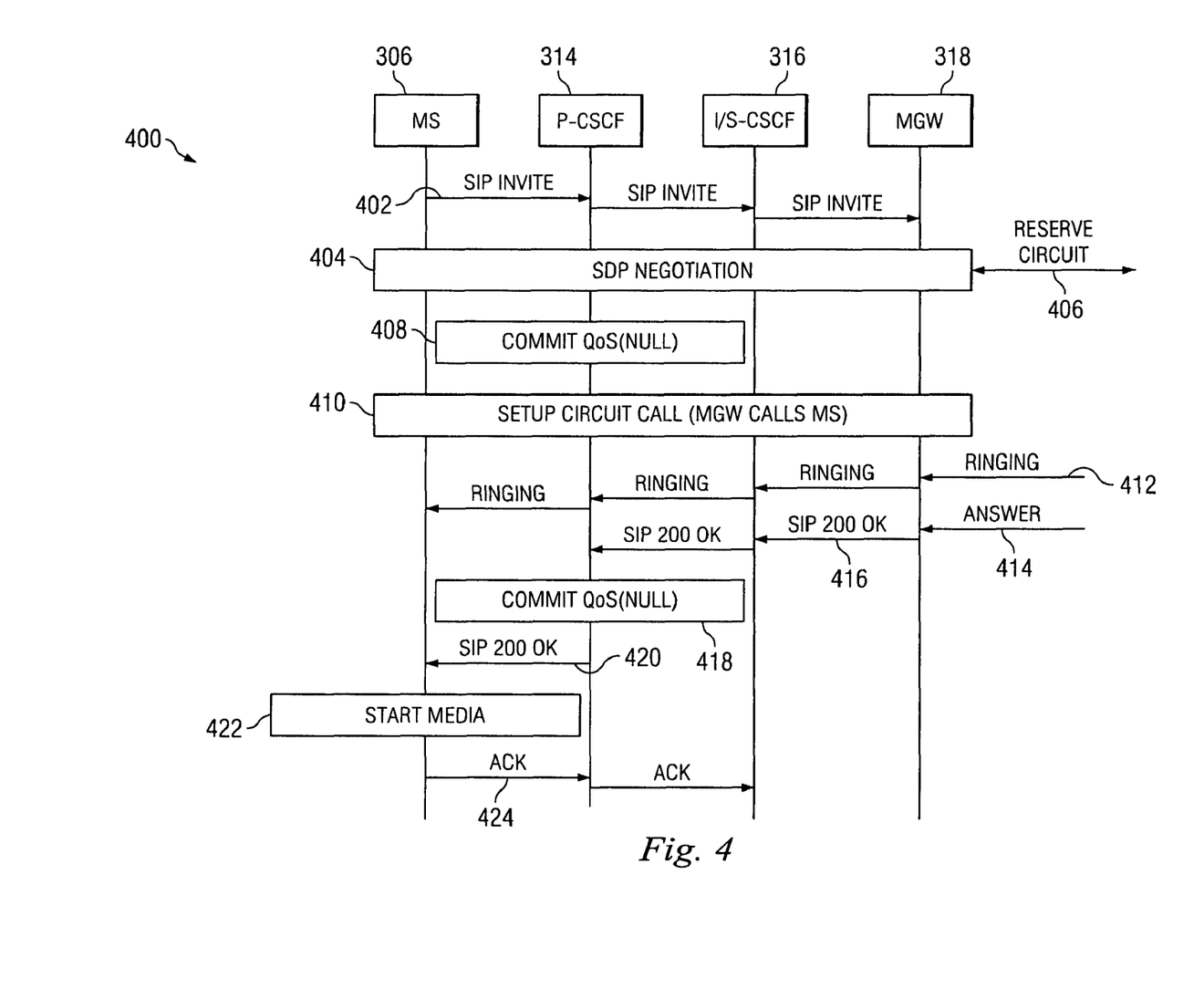
FIG. 4 is an exemplary call flow illustrating a call set-up in which a circuit bearer is requested by a network via a media gateway within the architecture of FIG. 3.

With additional reference to FIG. 4, a call flow 400 illustrates a sequence of messages that may be used to within the architecture 300 of FIG. 3. In the call flow 400, the MGW 318 is used to establish the circuit domain connection 320. As shown in FIG. 4, the call flow 400 includes the MS 306, the P-CSCF 314, the I/S-CSCF 316, and the MGW 318.

The call flow 400 relies heavily upon SIP messaging. As is known, SIP is based on a request-response paradigm and may be divided into SIP request messages and SIP response messages. SIP request messages include INVITE (which initiates a call or changes call parameters), ACK (which confirms a final response for INVITE), BYE (which terminates the call), CANCEL (which cancels an ongoing INVITE), OPTIONS (which queries a server about its capabilities), REGISTER (which registers with the location service), and INFO (which sends in-progress information). The SIP response messages may contain response codes such as 100 (continue), 180 (ringing), 200 (OK), 302 (moved temporarily), 401 (unauthorized), and 600 (busy). The use of SIP enables flexibility in the call session, and may also serve to align the call session with known standards, such as 3GPP IMS.

The call flow 400 begins in step 402 when the MS 306 sends a SIP INVITE message to the P-CSCF 314. The INVITE message includes an initial session description protocol (SDP) packet in the SIP INVITE message body. SDP is a protocol that may be used to indicate a multimedia session, and may include such information as a session name and purpose. The SIP INVITE message is forwarded from the P-CSCF 314 to the MGW 318 via the I/S-CSCF 316

The MS 306, P-CSCF 314, I/S-CSCF 316, and MGW 318 conduct SDP negotiations via SIP messages in step 404. These negotiations may include SDP answer, SDP offer, SDP success, and SDP answer exchanges. In the present example, one of the SDP packets may include a codec value to indicate that a circuit bearer is being used. The SDP negotiations include a reservation of circuit resources by the MGW 318, as indicated by step 406.

In step 408, the P-CSCF 314 utilizes a packet control function (PCF) mechanism to authorize QoS resources requested during the SDP negotiations in step 404, which may occur multiple times during the SDP negotiations. In the present example, this a NULL operation because no QoS is being requested (i.e., conversational grade QoS is inherent in the circuit domain connection 320 and need not be requested). In step 410, the MGW 318 sets up first and second circuit legs to the MS 306 and the other party 308, respectively. It is noted that the second circuit leg may be either packet switched or circuit switched.

The MGW 318 receives a ringing indication in step 412 and maps the ringing indication to a SIP ringing response message, which is then sent to the MS 306 via the I/S-CSCF 316 and P-CSCF 314. When the MGW 318 receives an answer indication in step 414, it relays this information as a SIP OK message to the P-CSCF 314 via the I/S-CSCF 316 in step 416. The P-CSCF 314 utilizes the PCF to commit the requested QoS in step 418, which is a NULL operation because no QoS was requested. The P-CSCF 314 then forwards the SIP OK message to the MS 306 in step 420. The MS 306 may then begin using the media resources authorized and committed in the call set-up in step 422. In step 424, the MS 306 sends a SIP ACK message to the I/S-CSCF 316 via the P-CSCF 314.

Referring again specifically to FIG. 3, in another embodiment, the architecture 300 may be requested by the mobile device 306 (rather than by the network via the MGW 318, as described above). As stated previously, the architecture 300 may be used for a call session that provides IP based, real-time, conversational, multimedia services using 3GPP IMS prior to the introduction of IP QoS mechanisms in the network.

In operation, as will be described in greater detail in FIG. 5, a signaling PDP context may be established between the MS 306 and the GGSN 310. SIP signaling then occurs between the MS 306 and the P-CSCF 314 to establish a call session. Network services may be executed using the S-CSCF 316. A first leg of the session may be established over either a packet or circuit connection, and may use a SIP VoIP or SIP circuit bearer call setup.

The second leg of the connection (the circuit domain connection 320) is set up by the MS 306. During SIP/SDP signaling that occurs between the MS 306 and P-CSCF 314, a circuit bearer codec is included that indicates that a circuit connection is to be established. The MS 306 recognizes the circuit bearer codec and requests a circuit connection via the MGW 318. The MGW 318 then bridges both the first and second legs to connect the MS 306 and other party 308, and may remain in the session for mid-call service control.

Figure 5:
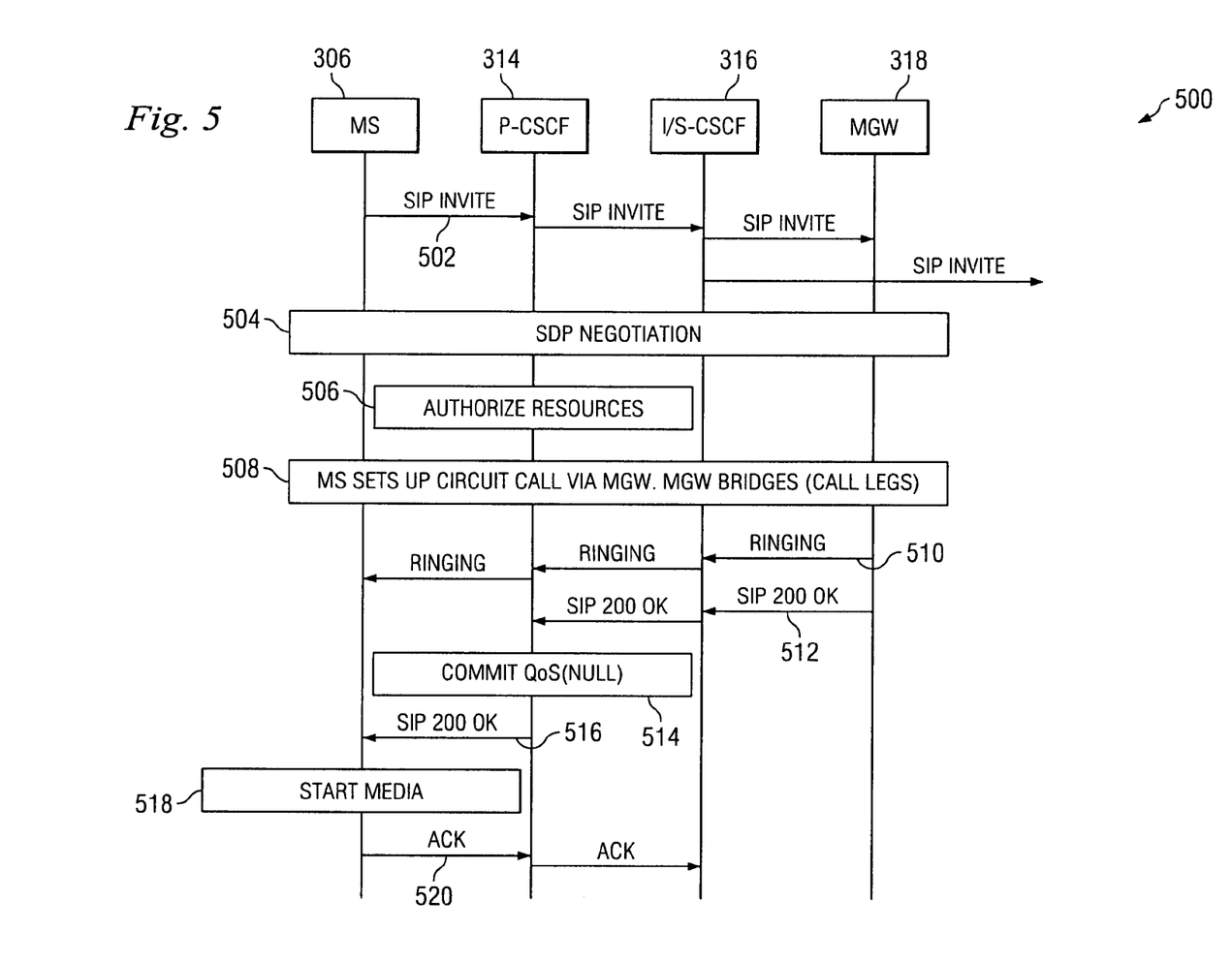
FIG. 5 is an exemplary call flow illustrating a call set-up in which a circuit bearer is requested by a mobile device within the architecture of FIG. 3.

With additional reference to FIG. 5, a call flow 500 illustrates a sequence of messages that may be used within the architecture 300 of FIG. 3. In the call flow 500, the MS 306 is used to establish the circuit domain connection 320. As shown in FIG. 5, the call flow 500 includes the MS 306, the P-CSCF 314, the I/S-CSCF 316, and the MGW 318. As in the call flow 400 of FIG. 4, the call flow 500 relies heavily upon SIP messaging.

The call flow 500 begins in step 502 when the MS 306 sends a SIP INVITE message to the P-CSCF 314. As described previously, the INVITE message includes an initial SDP packet in the SIP INVITE message body. The SIP INVITE message 302 is forwarded from the P-CSCF 314 to the MGW 318 via the I/S-CSCF 316, and may also be forwarded to another network entity, such as a terminator CSCF.

The MS 306, P-CSCF 314, I/S-CSCF 316, and MGW 318 conduct SDP negotiations via SIP messages in step 504. These negotiations may include SDP answer, SDP offer, SDP success, and SDP answer exchanges. In the present example, one of the SDP packets may include a codec value to indicate that a circuit bearer is being used. In step 506, the P-CSCF 314 utilizes a PCF mechanism to authorize QoS resources requested during the SDP negotiations 304, which may occur multiple times during the SDP negotiations. In the present example, this a NULL operation because no QoS is being requested (i.e., conversational grade QoS is inherent in the circuit domain connection 320 and need not be requested). In step 508, the MGW 318 sets up a first call leg with the other party 308, and the MS 306 sets up a circuit call (a second call leg) to the MGW 318 via the circuit domain connection 320. The MGW 318 then bridges the first and second call legs.

In step 510, the MGW 318 sends a ringing indication to the MS 306 via the I/S-CSCF 316 and P-CSCF 314. When the MGW 318 receives an answer indication in step 512, it relays this information as a SIP OK message to the P-CSCF 314 via the I/S-CSCF 316. The P-CSCF 314 utilizes the PCF to commit the requested QoS in step 514, which is a NULL operation because no QoS was requested. The P-CSCF 314 then forwards the SIP OK message to the MS 306 in step 516. The MS 306 may then use the media resources authorized and committed in the call set-up in step 518. In step 520, the MS 306 sends a SIP ACK message to the I/S-CSCF 316 via the P-CSCF 314.

Figure 6:
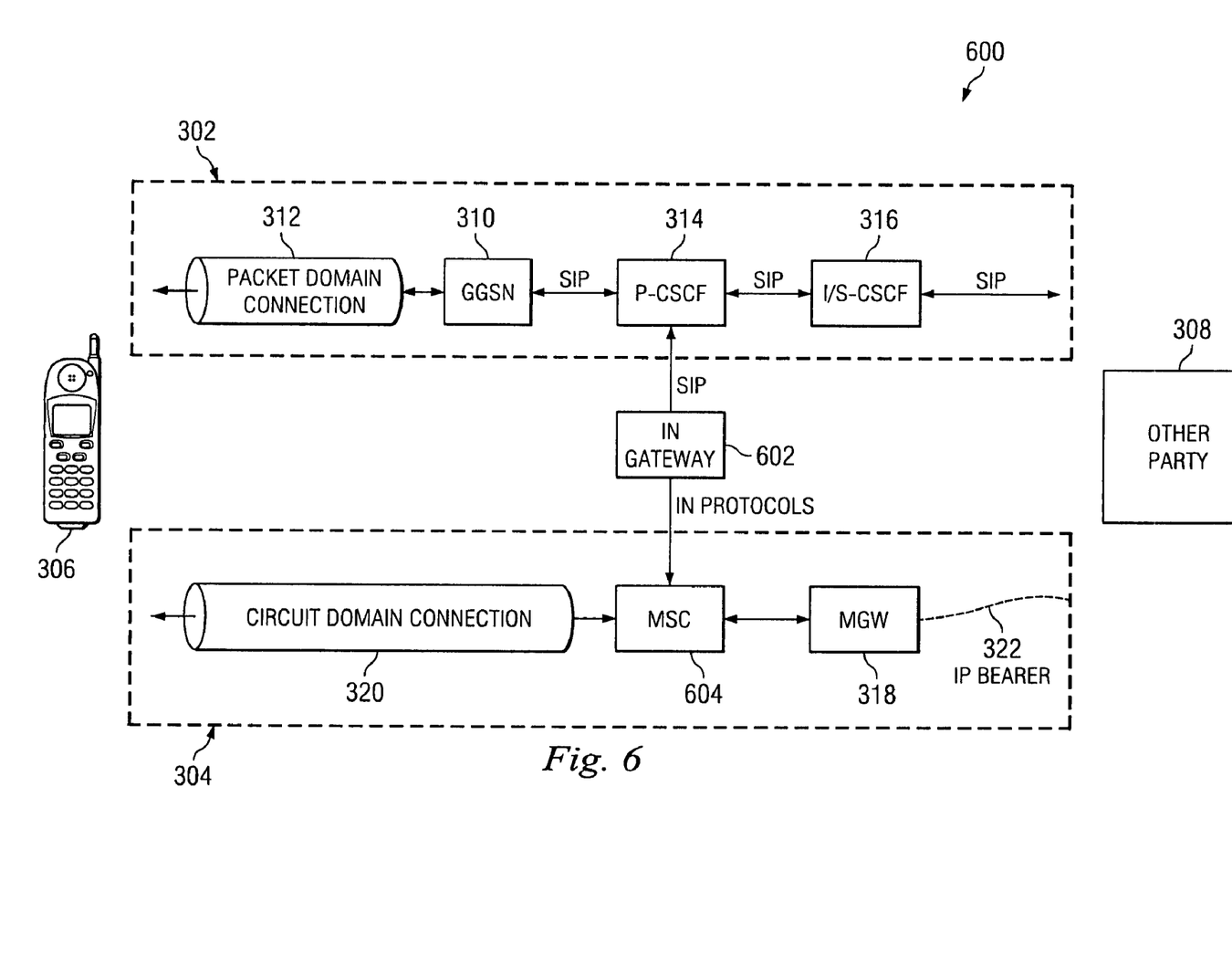
FIG. 6 illustrates another embodiment of an architecture that may be used to implement the method of FIG. 1 within the system of FIG. 2.

Referring now to FIG. 6, an architecture 600 illustrates another possible implementation of a call session representing the method 100 of FIG. 1. In the present example, a communication session within the architecture 600 may be requested by the network via an intelligent gateway (rather than by the MS 306 or by the network via the MGW 318, as described above). The architecture 600 may be used to provide IP based, real-time, conversational, multimedia services using 3GPP IMS prior to the introduction of IP QoS mechanisms in the network.

The architecture 600 is similar to the architecture 300 of FIG. 3, but includes an intelligent network gateway (IN gateway) 602 and a MSC 604. The IN gateway 602 is positioned between the P-CSCF 314 and the MSC 604. The MSC 604 is positioned between the circuit domain connection 320 and the MGW 318. It is understood that the positions of the IN gateway 602 and the MSC 604 are for purposes of illustration, and that they may be positioned elsewhere within the architecture 600. Furthermore, the IN gateway 602 may be represented by a gateway function located on another network entity, such as the MSC 604, and so the IN gateway 602 may not be an independent physical network entity. The IN gateway 602 provides functionality for mapping between IP/SIP messages and SS7/IN messages.

Figure 7:
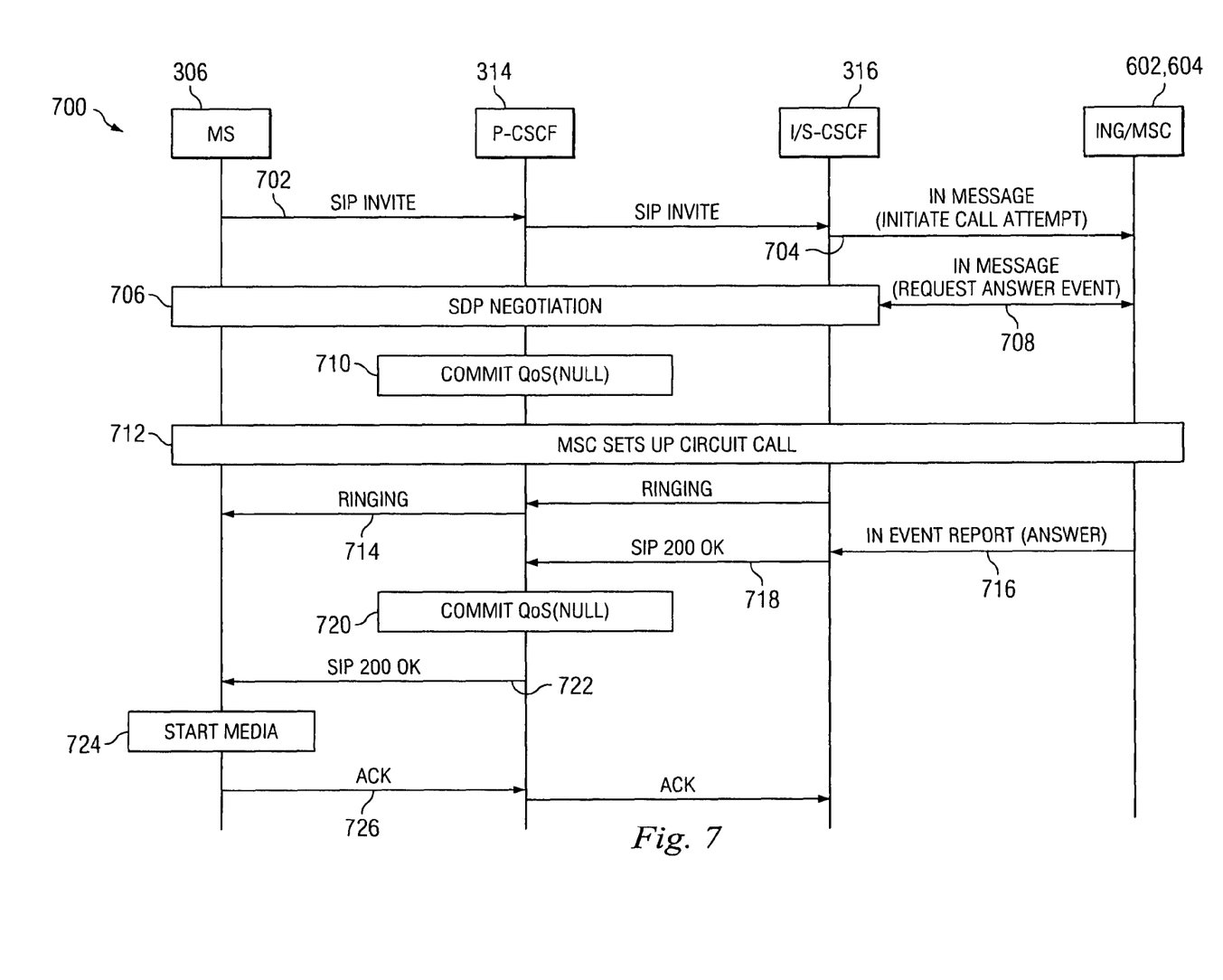
FIG. 7 is an exemplary call flow illustrating a call set-up in which a circuit bearer is requested by a network via an intelligent gateway within the architecture of FIG. 6.

In operation, as will described in greater detail in FIG. 7, a signaling PDP context may be established between the MS 306 and the P-CSCF 314 (via the GGSN 310). SIP signaling then occurs between the MS 306 and the P-CSCF 314 to establish a call session. Network services may be executed using the S-CSCF 316. A first leg of the session may be established using either a packet or circuit connection via an IN protocol message to the MSC 604. In the present example, the first leg is established using a standard SIP VoIP or SIP circuit bearer call setup.

The second leg of the connection (the circuit domain connection) is requested by the MS 306 via an IN message to the MSC 604. The first and second legs are then bridged to connect the MS 306 and other party 308. If both legs are circuit based, the bridging may be done by the MSC 604 without the need for the MGW 318. However, if the first leg is packet based, then the MGW 318 may be needed to complete the bridging in conjunction with the MSC 604.

With additional reference to FIG. 7, a call flow 700 illustrates a sequence of messages that may be used to establish the communication session described previously, in which the network requests the circuit domain connection 320 via the IN gateway 602. As shown in FIG. 7, the call flow 700 includes the MS 306, the P-CSCF 314, the I/S-CSCF 316, and the IN gateway 602 and MSC 604 (which are combined in this illustration and denoted by the reference number 604).

The call flow 700 begins in step 702 when the MS 306 sends a SIP INVITE message to the P-CSCF 314. As described previously, the INVITE message includes an initial SDP packet in the SIP INVITE message body. The SIP INVITE message is forwarded to the I/S-CSCF 316, which sends a corresponding IN message to the MSC 604 (via the IN gateway 602) to request a circuit connection in step 704.

In step 706, the MS 306, P-CSCF 314, and I/S-CSCF 316 conduct SDP negotiations via SIP messages. These negotiations may include SDP answer, SDP offer, SDP success, and SDP answer exchanges. In the present example, one of the SDP packets may include a codec value to indicate that a circuit bearer is being used. In step 708, which may occur simultaneously with step 706, interaction occurs with the IN gateway/MSC 604 to request answer notifications. In step 710, the P-CSCF 314 utilizes a PCF mechanism to authorize QoS resources requested during the SDP negotiations, which may occur multiple times during the SDP negotiations. In the present example, this a NULL operation because no QoS is being requested (i.e., conversational grade QoS is inherent in the circuit domain connection 320 and need not be requested). In step 712, the MSC 604 sets up first call leg (which is circuit based in the present example) with the other party 308, and sets up a second call leg with the MS 306 via the circuit domain connection 320.

In step 714, the I/S-CSCF 316 sends a ringing indication to the MS 306 via the P-CSCF 314. When the MSC 604 receives an answer, it reports this to the I/S-CSCF 316 in step 716. In step 718, the I/S-CSCF 316 relays this information as a SIP OK message to the P-CSCF 314. The P-CSCF 314 utilizes the PCF to commit the requested QoS in step 720, which is a NULL operation because no QoS was requested. The P-CSCF 314 then forwards the SIP OK message to the MS 306 in step 722. The MS 306 may then use the media resources authorized and committed in the call set-up in step 724. In step 726, the MS 306 sends a SIP ACK message to the I/S-CSCF 316 via the P-CSCF 314.

Figure 8:
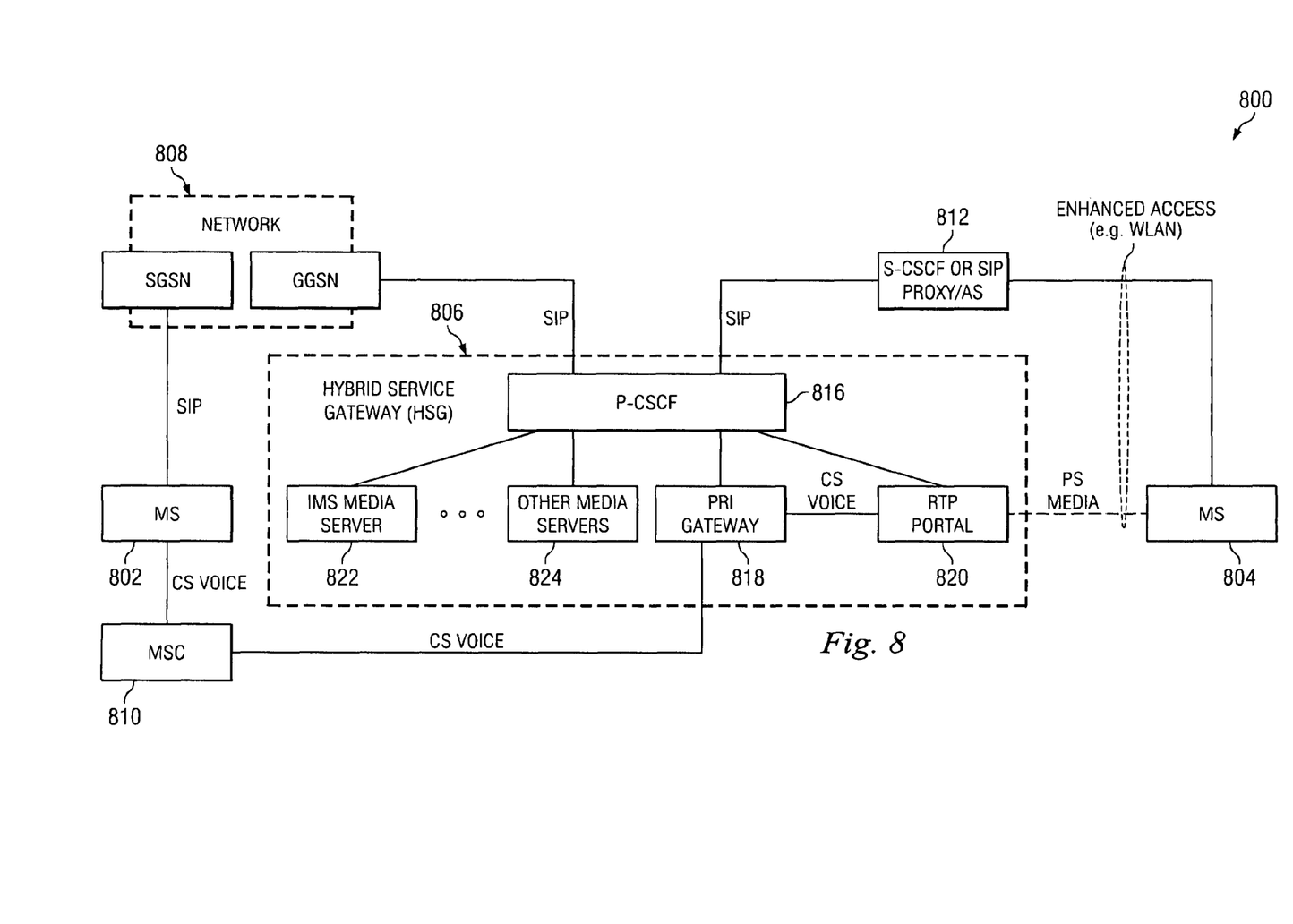
FIG. 8 illustrates yet another embodiment of an architecture that may be used to implement the method of FIG. 1 within the system of FIG. 2.

Referring now to FIG. 8, in another embodiment, an architecture 800 illustrates yet another possible architecture within which a call session representing the method 100 of FIG. 1 may be executed. As with previous examples, the architecture 800 may be used to provide IP based, real-time, conversational, multimedia services. For example, the services may be provided using IMS prior to the introduction of IP QoS mechanisms generally needed for the provision of such services. Connections within the architecture 800 may be circuit switched (CS) or packet switched (PS).

The architecture 800 includes an MS 802 and an MS 804. Disposed between the two mobile stations is a hybrid service gateway (HSG) 806. A network 808 (which may include network entities such as an SGSN, a GGSN, and/or other entities as described in FIG. 2) and an MSC 810 are positioned between the MS 802 and the HSG 806. An S-CSCF or SIP proxy/AS 812 is positioned between the MS 804 and the HSG 806, although not all connections between the MS 804 and the HSG 806 may go through the SIP AS 812.

The HSG 806 includes a plurality of different functions, which may be represented as actual independent physical components or may be represented merely as a functional module of the HSG 806. For purposes of clarity, these functions will be referred to as independent components that are combined within the HSG 806. In the present example, the HSG 806 acts as a P-CSCF 816 (e.g., it provides no services and controls the media in the local network). The HSG 806 also encompasses a SIP Primary Rate Interface (PRI) gateway 818, a Real-Time Protocol (RTP) portal 820, an IMS media server 822, and various other media servers 824.

The PRI gateway 818 may provide access to and from a network (such as an IP network) by acting as a signaling and media gateway between a VoIP network and a circuit based network, using the ISDN Primary Rate Interface. To provide access, the PRI gateway 818 generally converts packet-based voice streams to circuit-based voice streams and vice versa. The RTP portal 820 may enable elements in a private SIP network to securely communicate with elements in a public network in both directions. The RTP portal 820 may also serve as an anchor point for the RTP media stream. This provides additional flexibility by, for example, enabling the architecture 800 to work with voice broadcast types of services.

In operation, as will be described in greater detail with reference to FIGS. 9 and 10, services may be provided at the S-CSCF (or the SIP proxy/AS) 812. Because of this, the MS 804 may be unaware that a circuit switched leg is being used (e.g., SIP services, such as call forwarding and web based provisioning, are entirely re-used from IMS). Furthermore, the PRI gateway 818 may not "call" the MS 804. Instead, SIP signaling may be used to provide the MS 804 with a port number at the RTP portal 820, which provides a "true" VoIP SIP session set up. In addition, while the architecture 800 may enable both legs to be circuit switched, it may be desirable to add an additional PRI gateway. Access methods may be mixed by registering with a different P-CSCF (e.g., using R6 VoIP method, WLAN, LAN, etc.).

Figure 9:
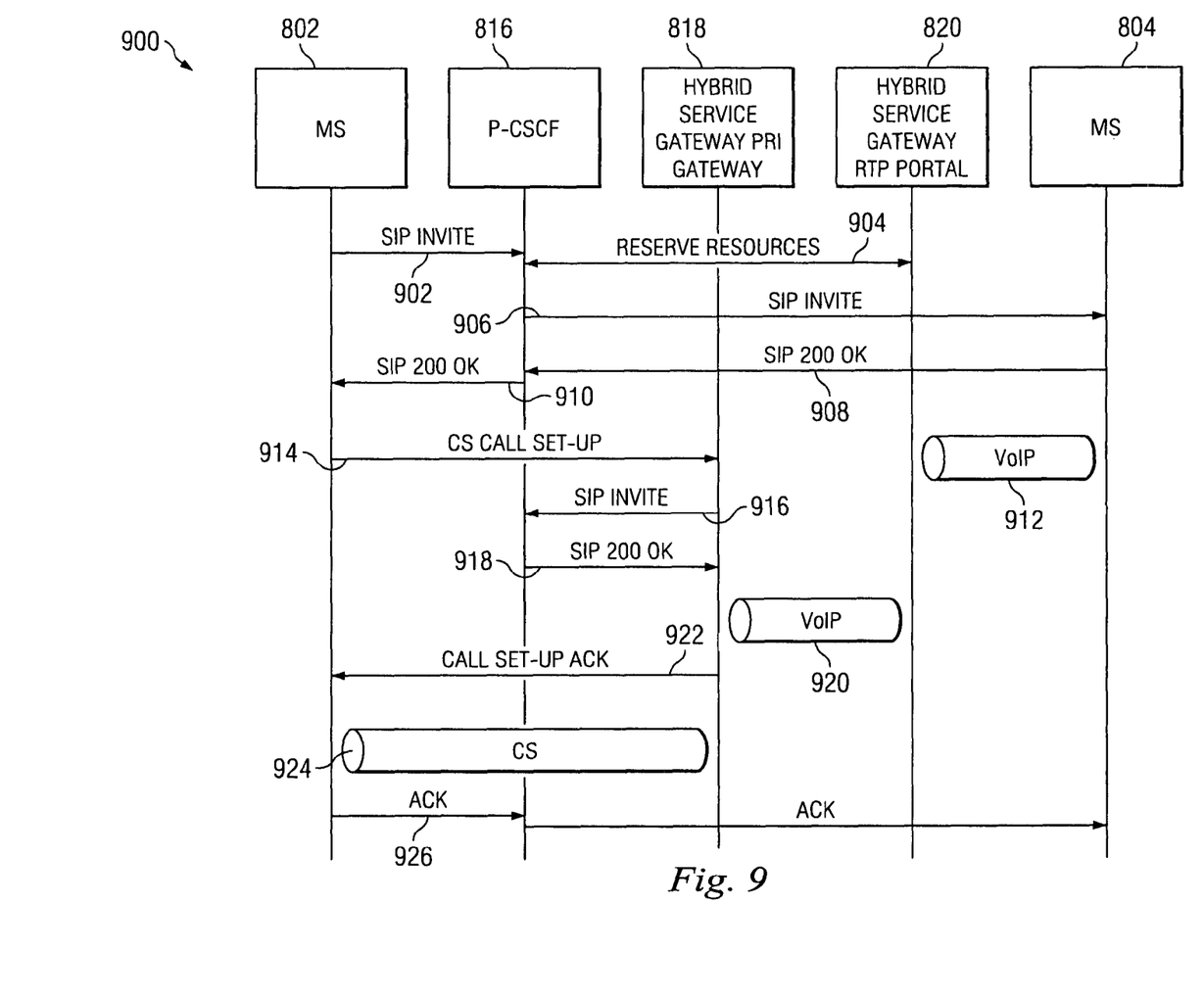
FIG. 9 is an exemplary call flow illustrating a call set-up in which a mobile device initiates a call to a network within the architecture of FIG. 8.

With additional reference to FIG. 9, a call flow 900 illustrates a sequence of messages that may be used to provide a communication session initiated by the MS 802 within the architecture 800 of FIG. 8, where one leg is circuit based and one leg is packet based (e.g., VoIP). As shown in FIG. 9, the call flow 900 includes the MS 802, the SIP AS 812, the HSG PRI Gateway 818, the HSG RTP Portal 820, and the MS 804.

The call flow 900 begins in step 902 when the MS 802 sends a SIP INVITE message to the P-CSCF 816. It is understood that SIP messaging may be transferred via the SIP AS 812. The SIP INVITE message contains a SDP packet stipulating a null codec, so that no voice packets are sent over a packet switched network. In step 904, the P-CSCF 816 and RTP Portal 820 perform a handshake to reserve call resources. The P-CSCF 816 then sends a SIP INVITE message containing a SDP packet identifying an RTP portal port number to the MS 804 in step 906. In step 908, the MS 804 responds by sending a SIP OK message containing a SDP packet identifying the MS 804 to the P-CSCF 816. The P-CSCF 816 forwards the SIP OK message containing a SDP packet with a dummy domain name to the MS 802 in step 910. A VoIP bearer leg 912 is established between the MS 804 and the RTP portal 820. In the present example, the VoIP bearer leg 912 is established using a standard VoIP call set-up.

The MS 802 may use native device call setup procedures to initiate a circuit switched call in step 914 through the PRI gateway 818. The PRI gateway 818 sends a SIP INVITE message containing a SDP packet identifying the PRI gateway 818 to the P-CSCF 816 in step 916. In step 918, the P-CSCF 816 sends a SIP OK message identifying the RTP portal 820 to the PRI gateway 818. A VoIP bearer leg 920 is then established between the RTP portal 820 and the PRI gateway 818. As before, the VoIP bearer leg 920 may be established using a standard VoIP call set-up. The PRI gateway 818 sends a call set-up ACK message to the MS 802 in step 922. A circuit switched bearer leg 922 may then be established between the MS 802 and the PRI gateway 818. In step 924, the MS 802 sends a SIP ACK message to the P-CSCF 816, which forwards the message to the MS 804.

Figure 10:
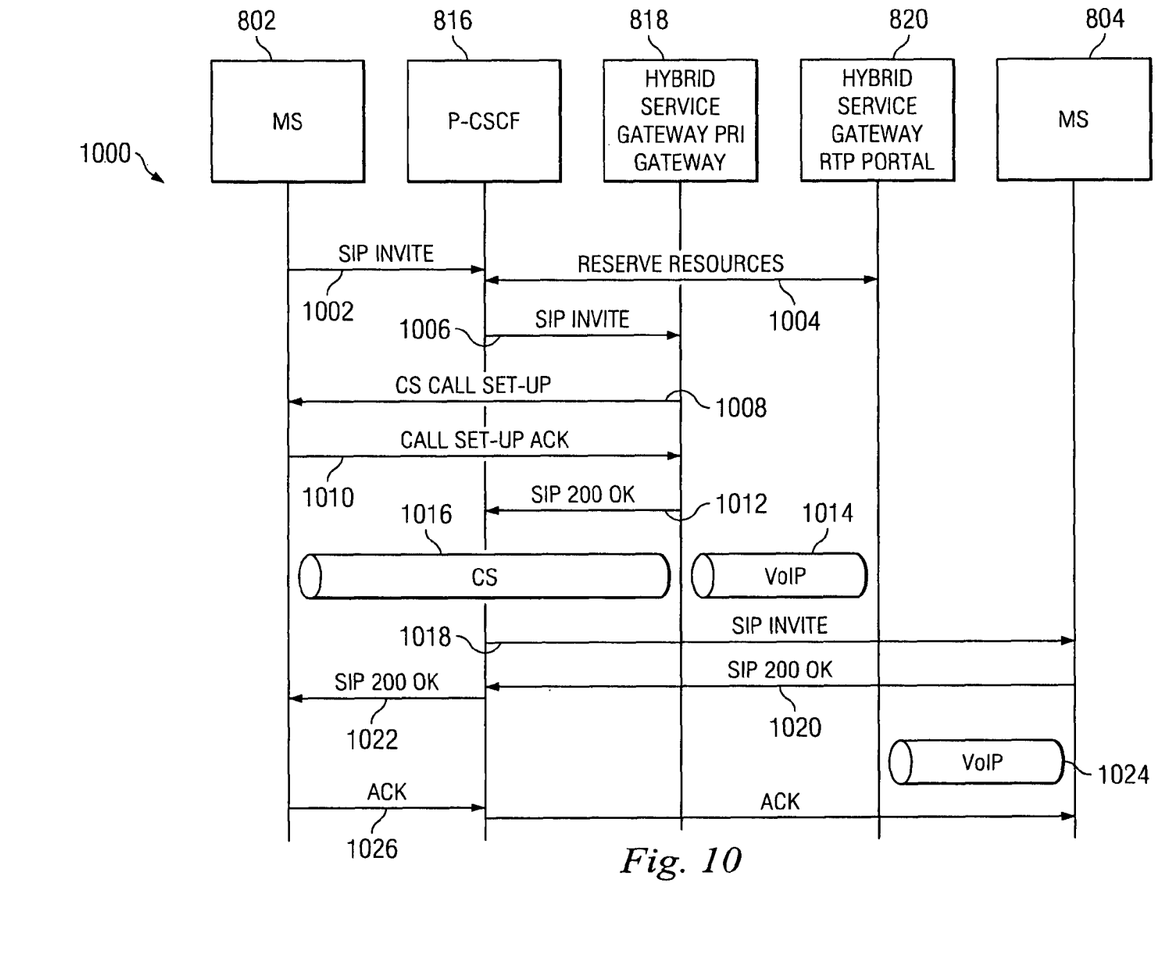
FIG. 10 is an exemplary call flow illustrating a call set-up in which a network initiates a call to a mobile device within the architecture of FIG. 8.

Referring now to FIG. 10 and with continued reference to FIG. 8, a call flow 1000 illustrates a sequence of messages that may be used to provide a communication session initiated by the network to the MS 802 within the architecture 800 of FIG. 8, where one leg is circuit based and one leg is packet based (e.g., VoIP). As shown in FIG. 10, the call flow 1000 includes the MS 802, the SIP AS 812, the HSG PRI Gateway 818, the HSG RTP Portal 820, and the MS 804.

The call flow 1000 begins in step 1002 when the MS 802 sends a SIP INVITE message to the P-CSCF 816. It is understood that the SIP messaging may be transferred via the SIP AS 812. The SIP INVITE message contains a SDP packet stipulating a null codec, so that no voice packets are sent over a packet switched network. In step 1004, the P-CSCF 816 and RTP Portal 820 perform a handshake to reserve call resources. The P-CSCF 816 sends a SIP INVITE message containing a SDP packet identifying the MS 802's domain name and the RTP Portal to the PRI gateway 818 in step 1006. In step 1008, the PRI gateway 818 sends a circuit switched call set-up message to the MS 802, which then returns a call set-up ACK message to the PRI gateway 818 in step 1010. The PRI gateway 818 sends a SIP OK message containing a SDP packet identifying the PRI gateway 818 to the P-CSCF 816 in step 1012. A VoIP circuit bearer 1014 is then established between the RTP portal 820 and the PRI gateway 818. In the present example, the VoIP bearer leg may be established using a standard VoIP call set-up. A circuit switched bearer leg 1016 is established between the PRI gateway 818 and the MS 802. In the present example, it may be desirable for the MS 802 to suppress incoming ringing.

In step 1018, the P-CSCF 816 sends a SIP INVITE message containing a SDP packet identifying the RTP portal 820 to the MS 804. In response, the MS 804 sends a SIP OK message containing a SDP packet identifying the MS 804 to the P-CSCF 816. The P-CSCF 816 inserts a dummy domain name into the packet and forwards the SIP OK message to the MS 802 in step 1022. A VoIP bearer path 1024 is established between the MS 804 and the RTP portal 820. The MS 802 sends a SIP ACK message to the P-CSCF 816 in step 1024, which forwards the SIP ACK message to the MS 804.

It is understood that the present disclosure provides for setting up a call using SIP or a similar protocol, and then using circuit switched network elements to provide part of the bearer path. This enables multimedia services, such as those defined by IMS, to be delivered in such a way that a client looking into the network has no knowledge that a circuit switched bearer forms part of the bearer path. This enables such services to be delivered via a network that has not implemented all the specified QoS mechanisms, and aligns the provision of the services with defined standards, such as the 3GPP IMS architecture. Furthermore, this approach permits a simple migration to a full VoIP bearer path as QoS mechanisms are introduced into a network. In addition, this enables the provision of a service control, billing, and authentication architecture that is identical to that proposed in 3GPP IMS or other standards. In the present disclosure, the bearer may be any type of real time, conversational voice (e.g., voice, video, gaming sessions, application sharing, etc.).

While the present disclosure uses 3GPP GPRS and UMTS technologies for purposes of illustration, it is understood that it may be equally applicable to other technologies, including fixed wireline access, wireless local area network (LAN) access such as 802.11, CDMA (Code Division Multiple Access)/1x RTT (Radio Transmission Technology)/1x EV-DO (Evolution Data Only) access, and/or other technologies.

Accordingly, while the preceding description shows and describes one or more embodiments, it will be understood by those skilled in the art that various changes in form and detail may be made therein without departing from the spirit and scope of the present disclosure. For example, the type of protocols used in the preceding description may vary, and it is understood that substitutions may be made. Similarly, different network configurations may be used for different types of digital devices. Furthermore, terms such as "first leg" and "second leg" are used for purposes of example, and do not necessarily denote a particular sequential or chronological order. In addition, it is understood that messages may be sent to or from different network entities than those shown. For example, although SIP INVITE messages are illustrated as being sent from the MS, a SIP INVITE may be sent to the MS in some embodiments. Therefore, the claims should be interpreted in a broad manner, consistent with the present disclosure.

What is claimed is:

1. A method for providing a packet-based multimedia service to a mobile device in a network, wherein the service is defined by a telecommunications standard, and wherein the network does not support packet quality of service (QoS) functionality as required by the standard, the method comprising:
   establishing a packet signaling connection between the mobile device and network;
   establishing a circuit bearer connection between the mobile device and network;
   transferring signaling information for the multimedia service via the packet signaling connection in alignment with the standard;

transferring data for the multimedia service via the circuit bearer connection in alignment with the standard, wherein the multimedia service is provided to the mobile device via the network as specified by the standard even though the network does not support the required QoS functionality; and executing at least one null operation to authorize QoS resources, wherein the operation is null because no QoS is requested due to the circuit bearer connection.

2. The method of claim 1 further comprising controlling the transfer of data via the circuit bearer connection using the signaling information.

3. The method of claim 1 further comprising requesting the circuit bearer connection, wherein the request is initiated by the network.

4. The method of claim 1 further comprising requesting the circuit bearer connection, wherein the request is initiated by the mobile device.

5. The method of claim 1 further comprising maintaining the circuit bearer and packet signaling connections simultaneously.

6. The method of claim 1 further comprising bridging the circuit bearer connection with an endpoint bearer connection, wherein the bridging establishes a link between the mobile device and the endpoint bearer connection.

7. A method for providing a packet-based multimedia service to an endpoint in a wireless network, wherein the service is defined by a telecommunications standard, and wherein the network does not support a packet quality of service (QoS) mechanism specified by the standard, the method comprising:

establishing a packet-based signaling context between the endpoint and a gateway;

establishing a circuit bearer leg between the endpoint and the gateway using the signaling context;

controlling the transfer of data via the circuit bearer leg using the signaling context, wherein the signaling context is used to control the provision of the packet-based multimedia service via the circuit bearer leg in alignment with the standard; and authorizing a previously requested QoS resource, wherein the authorization is null because no QoS is requested due to the circuit bearer connection.

8. The method of claim 7 further comprising initiating the establishment of the circuit bearer leg by either the endpoint or the gateway.

9. The method of claim 7 wherein the authorizing utilizes a packet control function.

10. The method of claim 7 wherein establishing the signaling context includes providing a codec indicating that a circuit bearer is being used.

11. The method of claim 7 wherein establishing the signaling context includes provisioning the endpoint with a null codec to prevent voice packets from being sent via an available packet signaling connection.

12. The method of claim 7 wherein using the signaling context includes using a packet-based session initiation protocol.

13. A telecommunications system for providing a packet-based multimedia service to a mobile station (MS) in a wireless network, wherein the service is defined by a telecommunications standard, and wherein the network does not support a packet quality of service (QoS) mechanism specified by the standard, the system comprising:

a proxy call session control function (P-CSCF); a media gateway connected to the P-CSCF; and a plurality of instructions for executing within the network, the instructions for:

establishing a packet signaling connection between the MS and the P-CSCF;

establishing a circuit bearer connection between the MS and the media gateway;

transferring signaling information for the multimedia service between the P-CSCF and the media gateway, and between the P-CSCF and the MS via the packet signaling connection in alignment with the standard; and transferring data for the multimedia service between the media gateway and the MS via the circuit bearer connection in response to the signaling information.

14. The system of claim 13 further comprising a serving call session control function (S-CSCF) connected to the P-CSCF and an endpoint, wherein a communication leg between the S-CSCF and the endpoint can be bridged with the circuit bearer connection to form a call session.

15. The system of claim 13 wherein functionality provided by the media gateway and the P-CSCF is combined in a hybrid service gateway (HSG).

16. The system of claim 15 further comprising a plurality of media servers connected to the HSG via the P-CSCF.

17. The system of claim 13 further comprising: a mobile switching center (MSC) positioned between the MS and the media gateway, wherein the circuit bearer connection is established between the MS and MSC; and an intelligent gateway positioned between the MSC and the P-CSCF, wherein the intelligent gateway maps signaling messages between the P-CSCF and the MSC.

18. The system of claim 13 wherein the network is a universal mobile telecommunications system (UMTS) wireless network, and wherein the telecommunications standard is an internet protocol multimedia subsystem (IMS) standard defined within a third generation partnership project (3GPP).

* * * * *